United States Patent
Hooshmand et al.

(10) Patent No.: US 10,333,306 B2
(45) Date of Patent: Jun. 25, 2019

(54) DATA-DRIVEN DEMAND CHARGE MANAGEMENT SOLUTION

(71) Applicant: NEC Laboratories America, Inc., Princeton, NJ (US)

(72) Inventors: Ali Hooshmand, San Jose, CA (US); Ratnesh Sharma, Fremont, CA (US); Ramin Moslemi, Athens, GA (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 15/833,301

(22) Filed: Dec. 6, 2017

(65) Prior Publication Data

US 2018/0166880 A1   Jun. 14, 2018

Related U.S. Application Data

(60) Provisional application No. 62/458,257, filed on Feb. 13, 2017, provisional application No. 62/433,874, filed on Dec. 14, 2016.

(51) Int. Cl.
*H02J 3/14* (2006.01)
*H02J 3/32* (2006.01)
(Continued)

(52) U.S. Cl.
CPC ............... *H02J 3/14* (2013.01); *G06F 17/18* (2013.01); *G06N 20/00* (2019.01); *G06Q 10/04* (2013.01);
(Continued)

(58) Field of Classification Search
CPC .... H02J 3/14; H02J 3/32; H02J 7/0013; H02J 7/007; H02J 2003/003; H02J 2007/0067;
(Continued)

(56) References Cited

U.S. PATENT DOCUMENTS

| | | | |
|---|---|---|---|
| 2004/0135544 A1* | 7/2004 | King | B60L 11/185 320/116 |
| 2011/0178643 A1* | 7/2011 | Metcalfe | F24D 19/1006 700/276 |

(Continued)

OTHER PUBLICATIONS

Moslemi, "A Data-Driven Demand Charge Management Solution for Behind-The-Meter Storage Application", Power & Energy Society Smart Grid Technologies Conference (ISGT) IEEE, Apr. 23-26, 2017, 6 pages.

(Continued)

*Primary Examiner* — Thomas C Lee
*Assistant Examiner* — Michael Tang
(74) *Attorney, Agent, or Firm* — Joseph Kolodka

(57) ABSTRACT

A computer-implemented method, system, and computer program product are provided for demand charge management. The method includes receiving an active power demand for a facility, a current load demand charge threshold (DCT) profile for the facility, and a plurality of previously observed load DCT profiles. The method also includes generating a data set of DCT values based on the current load DCT profile for the facility and the plurality of previously observed load DCT profiles. The method additionally includes forecasting a next month DCT value for the facility using the data set of DCT values. The method further includes preventing actual power used from a utility from exceeding the next month DCT value by discharging a battery storage system into a behind the meter power infrastructure for the facility.

20 Claims, 7 Drawing Sheets

(51) Int. Cl.
*H02J 7/00* (2006.01)
*G06F 17/18* (2006.01)
*G06Q 10/04* (2012.01)
*G06N 20/00* (2019.01)
G05B 15/02 (2006.01)
H02J 3/00 (2006.01)

(52) U.S. Cl.
CPC .............. *H02J 3/32* (2013.01); *H02J 7/007* (2013.01); *H02J 7/0013* (2013.01); *G05B 15/02* (2013.01); *H02J 2003/003* (2013.01); *H02J 2007/0067* (2013.01)

(58) Field of Classification Search
CPC ........ G06N 20/00; G06F 17/18; G06Q 10/04; G05B 15/02
See application file for complete search history.

(56) References Cited

U.S. PATENT DOCUMENTS

| | | | |
|---|---|---|---|
| 2013/0080021 A1* | 3/2013 | Schneider | G06F 19/00 701/101 |
| 2013/0190939 A1* | 7/2013 | Lenox | H02J 3/32 700/291 |
| 2013/0249494 A1* | 9/2013 | Ju | H02J 7/0029 320/134 |
| 2014/0070756 A1* | 3/2014 | Kearns | H02J 7/007 320/101 |
| 2015/0161233 A1* | 6/2015 | Flora | G06F 16/285 707/737 |

OTHER PUBLICATIONS

Moslemi, "A Machine Learning Based Demand Charge Management Solution", IEEE ISGT Europe Conference, Sep. 2017, 6 pages.

Rowe, "A Peak Reduction Scheduling Algorithm for Storage Devices on the Low Voltage Network", IEEE Transactions on Smart Grid vol. 5 Issue: 4; Jul. 2014, pp. 2115-2124.

Hida, "Load Following Operation of NAS Battery by Setting Statistic Margin to Avoid Risks", Power and Energy General Meeting 2010 IEEE; Jul. 22-29, 2010.

Oudalov, "Sizing and Optimal Operations of Battery Energy Storage System for Peak Shaving Application", Power Tech 2007 IEEE Lausanne, Jul. 1-5, 2007.

* cited by examiner

500

Receive an active power demand for a facility, a current load demand charge threshold (DCT) profile for the facility, and a plurality of previously observed load DCT profiles.
510

Generate a forecast model from a data set of DCT values based on the current load DCT profile for the facility and the plurality of previously observed load DCT profiles.
520

Forecast a monthly DCT value for the facility using the data set of DCT values.
530

Prevent actual power used from a utility from exceeding the forecast DCT by discharging a battery storage system into a behind the meter power infrastructure for the facility.
540

```
┌─────────────────────────────────────────┐
│ Receive an active power demand for a    │
│ facility, a current load demand charge  │
│ threshold (DCT) profile for the         │
│ facility, and a plurality of previously │
│ observed load DCT profiles.             │
│ 710                                     │
└─────────────────────────────────────────┘
                    │
                    ▼
┌─────────────────────────────────────────┐
│ Generate a data set of DCT values based │
│ on the current load DCT profile for the │
│ facility and the plurality of           │
│ previously observed load DCT profiles.  │
│ 720                                     │
└─────────────────────────────────────────┘
                    │
                    ▼
┌─────────────────────────────────────────┐
│ Forecast a next month DCT value for the │
│ facility using the data set of DCT      │
│ values.                                 │
│ 730                                     │
└─────────────────────────────────────────┘
                    │
                    ▼
┌─────────────────────────────────────────┐
│ Prevent actual power used from a        │
│ utility from exceeding the forecast DCT │
│ by discharging a battery storage system │
│ into a behind the meter power           │
│ infrastructure for the facility.        │
│ 740                                     │
└─────────────────────────────────────────┘
```

FIG. 7

DATA-DRIVEN DEMAND CHARGE MANAGEMENT SOLUTION

RELATED APPLICATION INFORMATION

This application claims priority to 62/433,874, filed on Dec. 14, 2016, and 62/458,257, filed on Feb. 13, 2017, incorporated herein by reference herein its entirety.

BACKGROUND

Technical Field

The present invention relates to electricity demand peak shaving and more particularly using a behind the meter (BTM) energy storage system to minimize the maximum demand peak for a billing period.

Description of the Related Art

Commercial/industrial customer electricity bills includes two components, the energy and demand charges. The first component is related to the amount energy consumed during a billing period and the later corresponds to the highest power demand during the billing period (i.e. a month). For large commercial/industrial loads, the demand charge (DC) contributes significantly to monthly electricity bills and can reach up to 50% of the monthly electric bill. Recently, due to decrease in the prices of power conditioning and the increases in the governmental incentives, installation of a behind the meter (BTM) energy management system (EMS) has become an appropriate solution to minimize the maximum demand peak over a billing period, and thereby the demand charge cost. Efficient demand peak shaving during an operation window requires finding an optimal charging and discharging schedule for a battery in the EMS to minimize the maximum peak of the load during the operation window. To obtain such optimal scheduling, the load forecast for the next billing period is required. However, since forecasting for individual loads can result in significant error, the performance of a BTM EMS equipped with the conventional demand charge management solution is usually poor.

SUMMARY

According to an aspect of the present principles, a computer-implemented method is provided for demand charge management. The method includes receiving an active power demand for a facility, a current load demand charge threshold (DCT) profile for the facility, and a plurality of previously observed load DCT profiles. The method also includes generating a data set of DCT values based on the current load DCT profile for the facility and the plurality of previously observed load DCT profiles. The method additionally includes forecasting a next month DCT value for the facility using the data set of DCT values. The method further includes preventing actual power used from a utility from exceeding the next month DCT value by discharging a battery storage system into a behind the meter power infrastructure for the facility.

According to another aspect of the present principles, a computer program product is provided for demand charge management. The computer program product comprising a non-transitory computer readable storage medium having program instructions. The program instructions executable by a computer to cause the computer to perform a method. The method includes receiving an active power demand for a facility, a current load demand charge threshold (DCT) profile for the facility, and a plurality of previously observed load DCT profiles. The method also includes generating a data set of DCT values based on the current load DCT profile for the facility and the plurality of previously observed load DCT profiles. The method additionally includes forecasting a next month DCT value for the facility using the data set of DCT values. The method further includes preventing actual power used from a utility from exceeding the next month DCT value by discharging a battery storage system into a behind the meter power infrastructure for the facility.

According to yet another aspect of the present principles, a demand charge management system is provided. The system includes a processor. The processor is configured to receive an active power demand for a facility, a current load demand charge threshold (DCT) profile for the facility, and a plurality of previously observed load DCT profiles. The processor is also configured to generate a data set of DCT values based on the current load DCT profile for the facility and the plurality of previously observed load DCT profiles. The processor is additionally configured to forecast a next month DCT value for the facility using the data set of DCT values. The processor is further configured to prevent actual power used from a utility from exceeding the forecast DCT by discharging a battery storage system into a behind the meter power infrastructure for the facility.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a flow diagram illustrating a method performed in the DCT forecaster, in accordance with an embodiment of the present principles;

FIG. 7 is a flow diagram illustrating a method performed in the DCT forecaster, in accordance with an embodiment of the present principles.

DETAILED DESCRIPTION OF PREFERRED EMBODIMENTS

In one embodiment, a novel and practical demand charge management solutions in which the demand charge threshold (DCT) is forecast is presented. During the real-time operation in the month, whenever the load goes above the calculated DCT, a storage unit is discharged to keep the grid power below the desired DCT value. Instead of forecasting next month's whole load profile, only the best achievable DCT is forecasted which reduces the complexity and the forecast error significantly. This approach searches for the similar sequence of DCT in the history of the load under study and other load profiles stored in the data center and then the next DCT is determined based on the behaviors of the observed similar DCT time series. The obtained threshold is implemented to reduce the next month demand charge of electricity bill.

In another embodiment, a new two-layer demand charge management solution (DCMS) to address challenges in the behind the meter energy management system is presented. A forecaster is implemented which estimates a minimum achievable DCT for the next month based on the optimal values of DCTs from the last few months. To establish the forecaster, machine learning tools such as K-mean clustering and Ridge regression tools are employed to develop a forecast engine which is able to predict a next month DCT for the next month based on the observed DCTs from the last few months. Then, the next month DCT is passed to a controller, which is responsible to keep the grid power bellow the next month DCT value by managing the battery storage charge and discharge schedule in real time operation.

Figure 1:
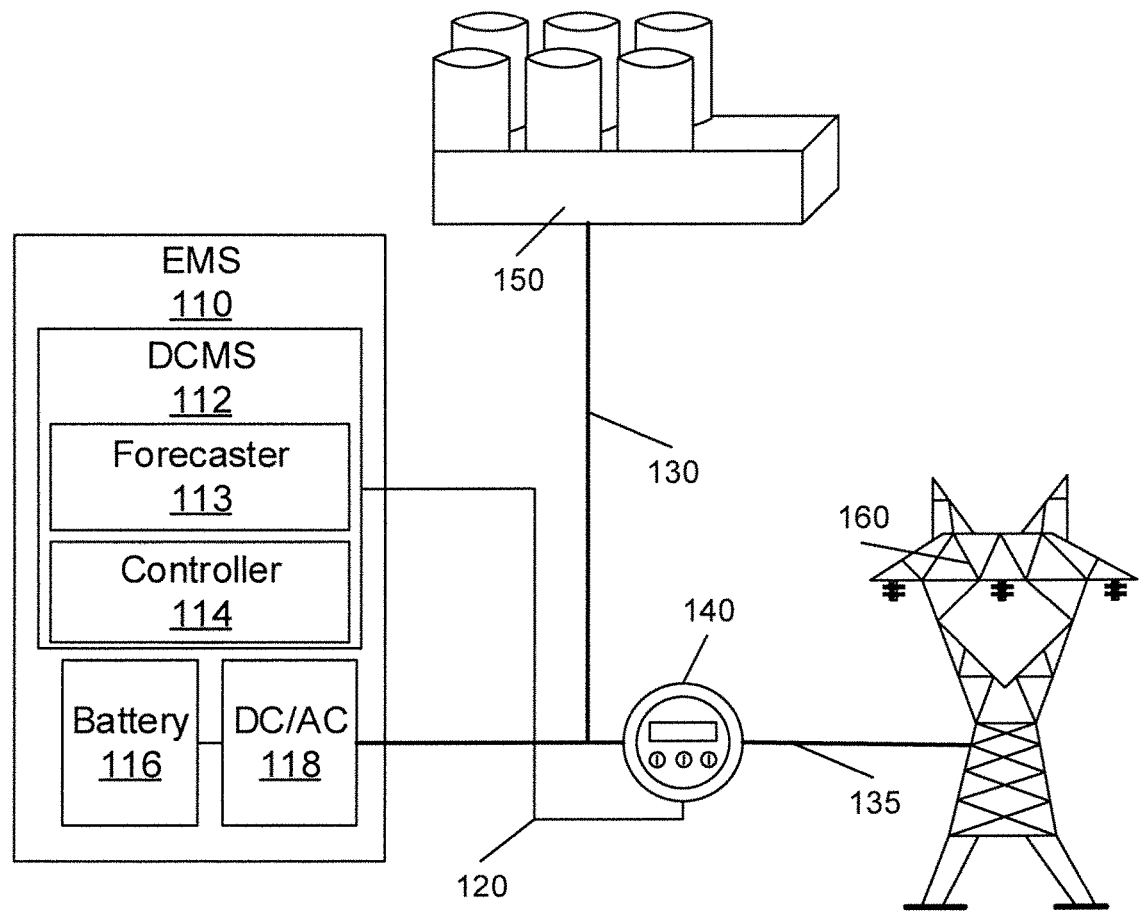
FIG. 1 shows a diagram illustrating a typical industrial customer using a behind the meter energy management system, in accordance with an embodiment of the present principles.

Referring now in detail to the figures in which like numerals represent the same or similar elements and initially to FIG. 1, a diagram illustrating a typical industrial customer using a behind the meter energy management system.

In FIG. 1, the behind the meter (BTM) energy management system (EMS) 110 receives measurement readings from a meter 140 installed between an industrial/commercial unit 150 and a distribution network 160. The BTM EMS 110 receives the measurement readings from the meter 140 through a communications link 120. The industrial/commercial unit 150 receives power from the BTM EMS 110 and the distribution network 160 through the behind the meter power infrastructure 130 and the utility power network 135. The BTM EMS 110 reduces the demand charge by employing an optimal discharging schedule during peak load periods.

The BTM EMS 110 consists of a battery 116, a power conditioning DC/AC module 118, and a demand charge management solution (DCMS) 112 including a forecaster 113 and a controller 114. The DCMS 112 is responsible to minimize the demand charge of the industrial/commercial unit 150 by providing optimal control commands to the power conditioning DC/AC module 118 based on the received measurements from the meter 140, state-of-charge (SOC) status from the battery 116 and economic signals from the system regulator.

The DCMS 112 is the controller of the BTM EMS 110 which provides the charge and discharge schedule of the battery 116. The DCMS 112 uses a two-step process in which the forecaster 113 provides a calculated demand charge threshold (DCT) for the controller 114.

The forecaster 113 sends the calculated DCT to the controller 114, so the controller 114 can keep the imported power from the utility grid below the DCT. The controller 114 determines a battery charge and discharge schedule based on the received DCT for the ongoing month as follows:

$$\text{Charge if: } \begin{cases} P_d(t) \leq DCT \\ SOC_b(t) \leq SOC_b^{max} \end{cases}$$

-continued $$\text{Discharge if: } \begin{cases} P_d(t) \geq DCT \\ SOC_b(t) \geq SOC_b^{min} \end{cases}$$

in which $P_d(t)$ is active power demand (load) at time t. $SOC_b^{max}$, $SOC_b^{min}$, and $SOC_b(t)$ are maximum state of charge, minimum state of charge, and state of charge at time t respectively.

In one embodiment, the history of the current load DCT profile and previously observed loads DCT history (stored in the data set) is used to forecast the next month DCT. Therefore, the complexity of the forecasting problem is decreased to forecast only a DCT value for the whole next month. The main idea behind this approach is that the next month DCT value can be forecasted with historical load data and if there is a lack of the historical load data (customers usually have limited history of the load), the similar behaviors of the previously observed loads (other customers loads and other available source of load profiles) could be used to in forecasting process. A forecaster process is shown in FIG. 2.

Figure 2:
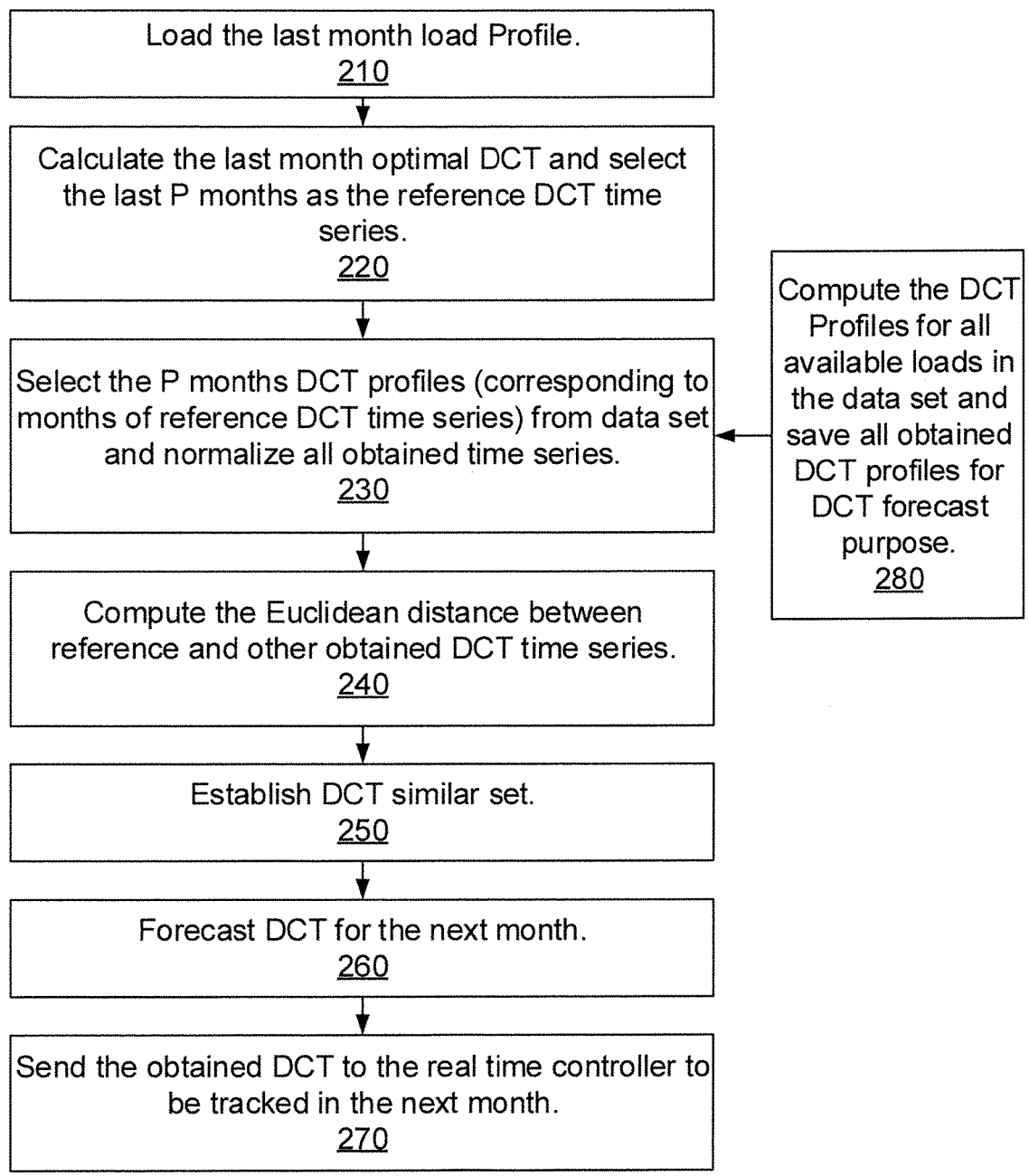
FIG. 2 is a flow diagram illustrating a method performed in the Demand Charge Threshold (DCT) forecaster, in accordance with an embodiment of the present principles.

Referring to FIG. 2, a flow chart for a method 200 performed in the DCT forecaster is illustratively shown, in accordance with an embodiment of the present invention. In block 210, retrieve the last month load profile at the end of each month. In block 220, use the last month load profile and calculate the last month optimal DCT. Given the received load profile, the block 220 obtains the optimal DCT for the last month using the following optimization:

$$\min_t J = C_{DC}^{anytime} \times \max(P_g(t))$$

$$\text{s.t. } SOC_b^{min} \leq SOC_b(t) \leq SOC_b^{max} \quad t = 1, \ldots, n$$

$$P_b^{min} \leq P_b(t) \leq P_b^{max} \quad t = 1, \ldots, n$$

$$P_d(t) = P_b(t) + P_g(t) \quad t = 1, \ldots, n$$

$$SOC_b(t) = SOC_b(t-1) + \Delta t \times P_b(t) \quad t = 1, \ldots, n.$$

where t is the time interval counter, n is the total number of the time intervals in the whole month and $\Delta t$ is the duration of each time interval (i.e. 15 minutes). $P_g(t)$ and $P_b(t)$ are the active powers provided by grid and battery discharge respectively to provide active power demand by load $P_d(t)$ at the time t. Also $SOC_b^{min}$ and $SOC_b^{max}$ are minimum and maximum allowed boundaries for the battery state of the charge (SOC) and $SOC_b(t)$ is the battery state of charge at time t. Finally, $P_b^{min}$ and $P_b^{max}$ defines the battery charge and discharge limits.

After the calculation of the last month optimal DCT, it is added to the time series of the load DCT profiles and the last P months DCT values are selected as the reference DCT time series. Finally, the updated reference DCT time series is passed to block 230.

In block 230, all DCT profiles corresponding to the same sequence of months of the reference DCT time series are retrieved from DCT profiles saved in the data set from block 280. Then all obtained DCT profiles are normalized based on their P months DCT average and passed to block 240.

In block 240, compute the Euclidean distance between reference and other obtained DCT time series. In this block, the normalized last P months of the DCT profiles are used to obtained a similarity level between them and a normalized load DCT profile (the reference DCT). The similarity level between two time series is obtained using a Euclidean distance:

$$D_E = \sqrt{\sum_{k=1}^{P} (x_k - v_k)^2}.$$

A lower Euclidean distance between two DCT profiles indicates a higher level of similarity between these two DCT profiles in last P months. The P months DCT time series along with their calculated Euclidean distances are passed to block 250.

In block 250, establish a DCT similar set. Among the DCT profiles (obtained by block 230), M profiles have higher similarity levels with the reference DCT profile are selected and saved as a similar DCT set, $DCT^s$. It should be noted that since the load DCT history exists in the data set, it is possible that last year load DCT profiles exists in the $DCT^s$. Then the similar DCT set, $DCT^s$ is passed to the block 260.

In block 260, forecast DCT for the next month. Block 260 forecasts the next month DCT based on the load last year DCT profile and DCT profiles in the similar DCT set ($DCT^s$). In this block, the algorithm checks if the previous year load DCT time series $DCT_j^{y-1} = \{DCT_{l_{(t-p-11)}}, \ldots, DCT_{l_{t-13}}, DCT_{l_{t-12}}\}$ exists in the calculated $DCT^s$ or not. Finally, if $DCT_j^{y-1}$ does not belong to $DCT^s$, the normalized DCT value for the coming month is forecasted as follows, $$DCT_{l_{t+1}} = \frac{1}{M+1} \times \left[ DCT_{l_{(t-11)}} + \sum_{i=1}^{M} DCT_i^s \right].$$

However, if the $DCT_j^{y-1} \in DCT^s$, the algorithm increases the weight of $DCT_{l_{(t-11)}}$ in the forecasting model and above formulation is forecasted as follows, $$DCT_{l_{t+1}} = \frac{1}{2M-2} \times \left[ (M-2)DCT_{l_{(t-11)}} + \sum_{i=1}^{M} DCT_i^s \right]$$

in other words, if the optimal DCT values of loads in last P months are significantly similar to behaviors of the same period last year, the algorithm relies mostly on the optimal DCT value of same month last year.

In block 270, the obtained DCT is denormalized and sent to the real-time controller 114 to be tracked during the next month.

In block 280, compute the DCT Profiles for all available loads in the data set and save all obtained DCT profiles for DCT forecast purpose. In order to forecast the next month DCT value, the proposed approach requires a data set of the previously observed DCT values. This information can be provided by using the historical load data of the previous customers using the log of the installed BTM battery storage units or other reliable sources of the real load historical data. After providing such load profiles, using the month load profile, the battery storage specification, the optimal value of DCT for each month is calculated using optimization shown above.

Figure 3:
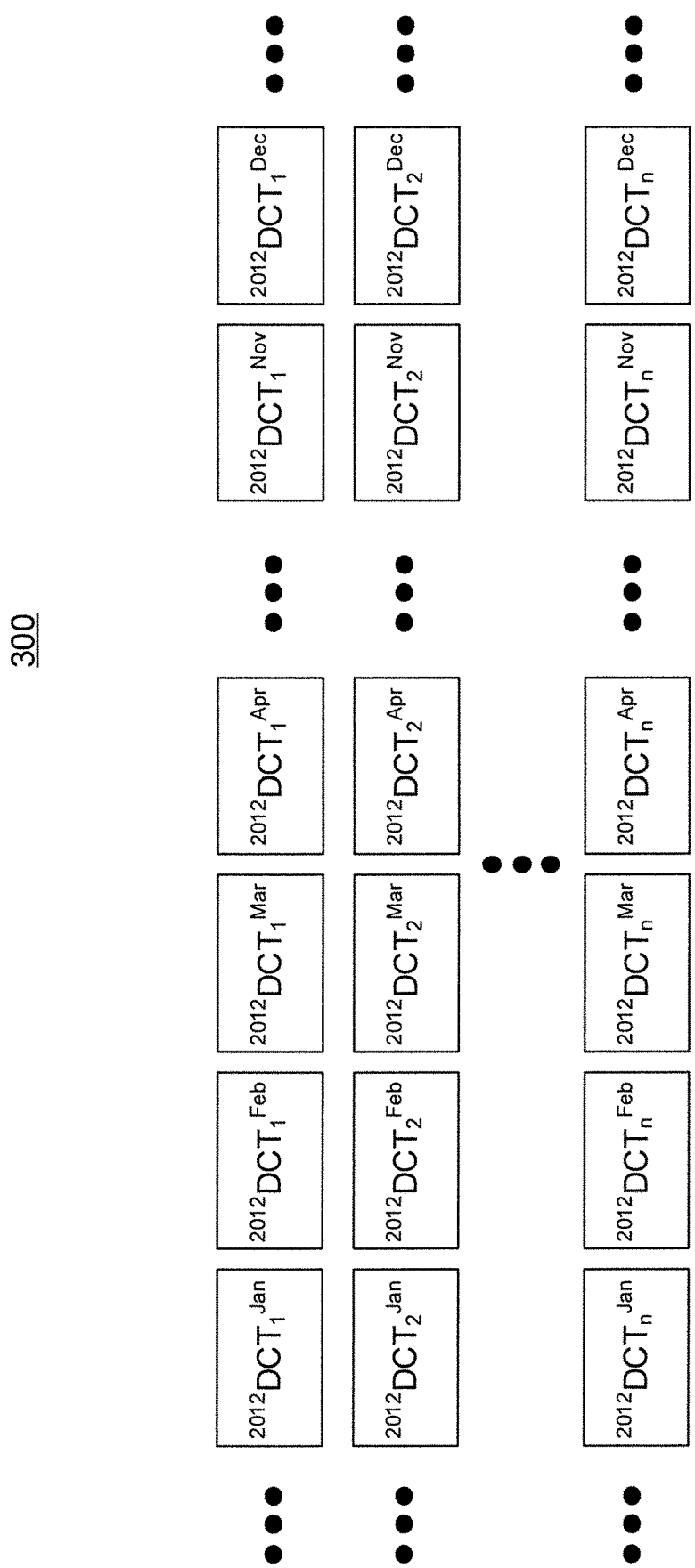
FIG. 3 shows a diagram illustrating a data set consisting of several years of DCT profiles of n observed loads, in accordance with an embodiment of the present principles.

After performing this procedure for all available load profiles, the data set is established as the collection of the DCT profiles for different loads as it has been shown in FIG. 3.

Referring to FIG. 3, a diagram illustrating a data set 300 consisting of several years of DCT profiles of n observed loads as generated in block 280 above.

In another embodiment, the forecaster 113 of the DCMS 112 predicts DCT for the next month of operation without dealing with monthly load profile prediction and associated forecasting errors. Therefore, instead of the challenging task of forecasting the whole month load profile, the focus is to obtain a forecast model for the next month DCT value.

The main idea behind the approach is that, given the first assumption, the DCT profile shows predictable behaviors, so a forecast model could be derived for the DCT time series. Also, in the absence of the DCT history of the load under study, the DCT profiles with similar behaviors could be used in the forecast modeling process. The forecaster 113 includes several major blocks shown in FIG. 4.

Figure 4:
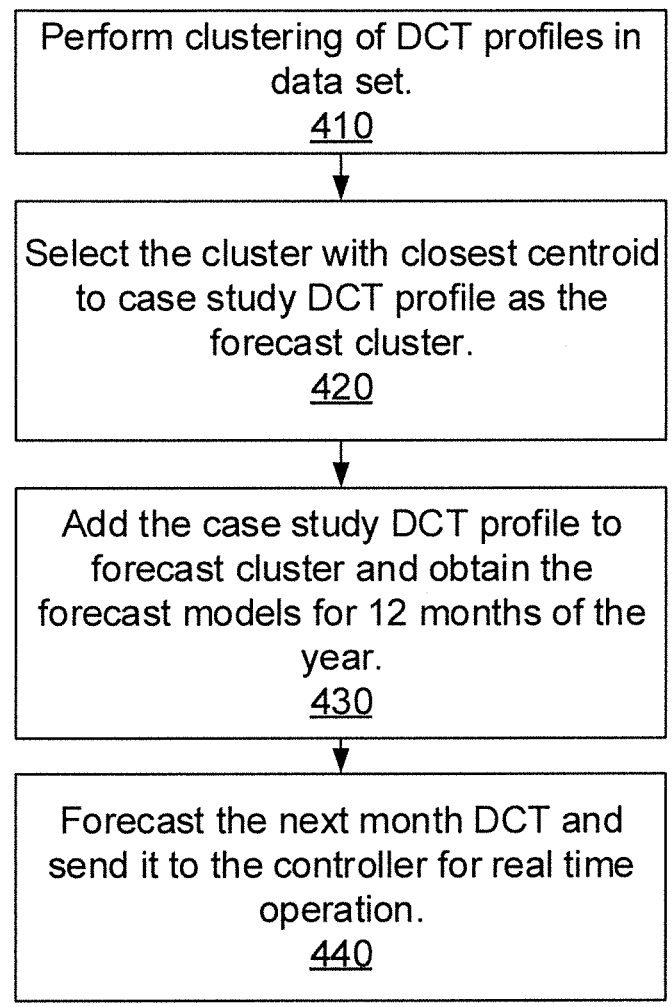
FIG. 4 is a flow diagram illustrating a method performed in the DCT forecaster, in accordance with an embodiment of the present principles.

Referring to FIG. 4, a flow chart for a method 400 performed in the forecaster is illustratively shown, in accordance with an embodiment of the present invention. In block 410, cluster the DCT profiles in the data set based on the similarity level between these time series. To develop an effective DCT forecasting model, a large and rich dataset of historical DCT time series is required. To this purpose, a dataset is created including the historical load profiles of the customer under study and all other customers that we have access to their historical data. Then, the optimization problem below is utilized to calculate the optimal DCT value of each monthly load profile in the load dataset:

$$\min_t J = C_{DC}^{anytime} \times \max(P_g(t))$$

$$\text{s.t. } SOC_b^{min} \leq SOC_b(t) \leq SOC_b^{max} \quad t = 1, \ldots, n$$
$$P_b^{min} \leq P_b(t) \leq P_b^{max} \quad t = 1, \ldots, n$$
$$P_d(t) = P_b(t) + P_g(t) \quad t = 1, \ldots, n$$
$$SOC_b(t) = SOC_b(t-1) + \Delta t \times P_b(t) \quad t = 1, \ldots, n.$$

The collection of the obtained optimal DCT values creates the DCT time series dataset required for a forecasting model. In the first step, the annual DCT time series of the loads in the data set are clustered and the centroid of each cluster is calculated. To better perform the clustering task, the process requires the trend of DCT profiles in the same scale of variations. To this end, the annual DCT profiles are normalized with respect to their mean annual values before clustering.

To perform clustering among annual DCT profiles in the data set, a K-means clustering approach is implemented. The K-means approach starts with arbitrarily chosen initial cluster memberships and minimizes the objective function by alternating between changes in the distribution of objects among clusters and updating the centers of the clusters based on the last changes in the members. Since, it is desired to cluster DCT profiles with similar trends over the 12 months in the same cluster, the following objective function is used in the K-means clustering algorithm:

$$\min J(U, V) = \sum_{i=1}^{c} \sum_{k=1}^{n} u_{ik} \|x_k - v_i\|$$

$$\text{s.t. } u_{ik} \in \{0, 1\} \quad \forall i \leq c, \forall k \leq n$$

$$\sum_{i=1}^{c} u_{ik} = 1 \quad \forall k \leq n$$

where, $x_k$ is the vector of $k^{th}$ DCT profiles and $v_i$ is center of $i^{th}$ cluster, also n and c are the numbers of DCT profiles in data set and desired number of the cluster. Finally, ‖.‖ is the Euclidean distance measure. It is worth noting that the number of clusters is a design parameter in the approach which should be determined based on the number and diversity of the DCT profiles in the data set. Finally, the obtained clusters and their corresponding centroids are passed to block 420.

In block 420, select the cluster with closest centroid to case study DCT profile as the forecast cluster. To this end the Euclidean distances between the load DCT profile and the centroids of the obtained clusters are calculated and the cluster with minimum distance is selected as the forecast cluster.

In block 430, add the case study DCT profile to forecast cluster and obtain the regression based DCT forecast model for the load case under study based on the DCT profile in the forecast cluster.

The regression model is constructed to forecast the DCT of $j^{th}$ month of year ($DCT_j$) based on the selected DCT cluster. Given the M prior months DCT values are features of the forecast model, the least square regression model could be presented as $$\min \frac{1}{L} \sum_{l=1}^{L} |w_j^T x_{jl} - y_{jl}|^2$$

where L is the number of the DCT profiles in forecast cluster, $w_j$ is the regression weight vector (size of $w_j$ is M+1) for $j^{th}$ month DCT forecast and $x_{jl}$=[1, $DCT_{j-M}$, $DCT_{j-m+1}$, . . . , $DCT_{j-1}$] and $y_{jl}$=$DCT_j$ are the $l^{th}$ sample vector and target value, respectively. Assuming $$X_j=[x_{j1},x_{j2}, \ldots ,x_{jL}]^T, Y_j=[y_{j1},y_{j2}, \ldots ,y_{jL}]^T.$$

The estimated regression coefficients can be represented as, $$w_j=(X_j^T X_j)^{-1} X_j Y_j.$$

To address the multicollinearity issue among the inputs variable, a Ridge least square regression model is employed in the forecaster 113, in which the stability of the least square regression model is increased by adding small constant value λ to the diagonal entries of the matrix ($X_j^T X_j$) before taking its inverse, $$^r w_j=(X_j^T X_j)^{-1} X_j Y_j$$

where $^r w_j$ is the least square weights for $j^{th}$ DCT forecast, obtained by a ridge least square regression approach.

In block 440, predicting the DCT optimal value for the next month and send it to the controller 114 for real time operation. Using the forecast model obtained by block 420. Block 440 predicts the case study next month optimal DCT value ($DCT_t^{CS}$) based on the last M months DCT values as $$DCT_t^{CS}=^r w_{t0}+^r w_{t1} DCT_{t-M}^{CS}+ \ldots +^r w_{tM+1} DCT_{t-1}^{CS}.$$

Since all DCT values have been normalized to obtain the real value, the obtained DCT forecast is denormalized using the case study annual DCT average value. Given the above description, the general framework of the forecaster 113 could be summarized as illustrated in FIG. 5. As the final note, selecting inappropriate M could results in overfitting or oversimplified model issues, therefore the number of prior months DCT values in the forecast model should be selected carefully based on the size of the forecast cluster and the nature of the DCT forecast problem.

Referring to FIG. 5, a flow diagram of a method 500 performed in the forecaster is illustratively shown, in accordance with an embodiment of the present invention. In block 510, receive an active power demand for a facility, a current load demand charge threshold (DCT) profile for the facility, and a plurality of previously observed load DCT profiles. In block 520, generate a forecast model from a data set of DCT values based on the current load DCT profile for the facility and the plurality of previously observed load DCT profiles. In block 530, forecast a monthly DCT value for the facility using the forecast model. In block 540, prevent actual power used from a utility from exceeding the monthly DCT by discharging a battery storage system into a behind the meter power infrastructure for the facility.

Figure 6:
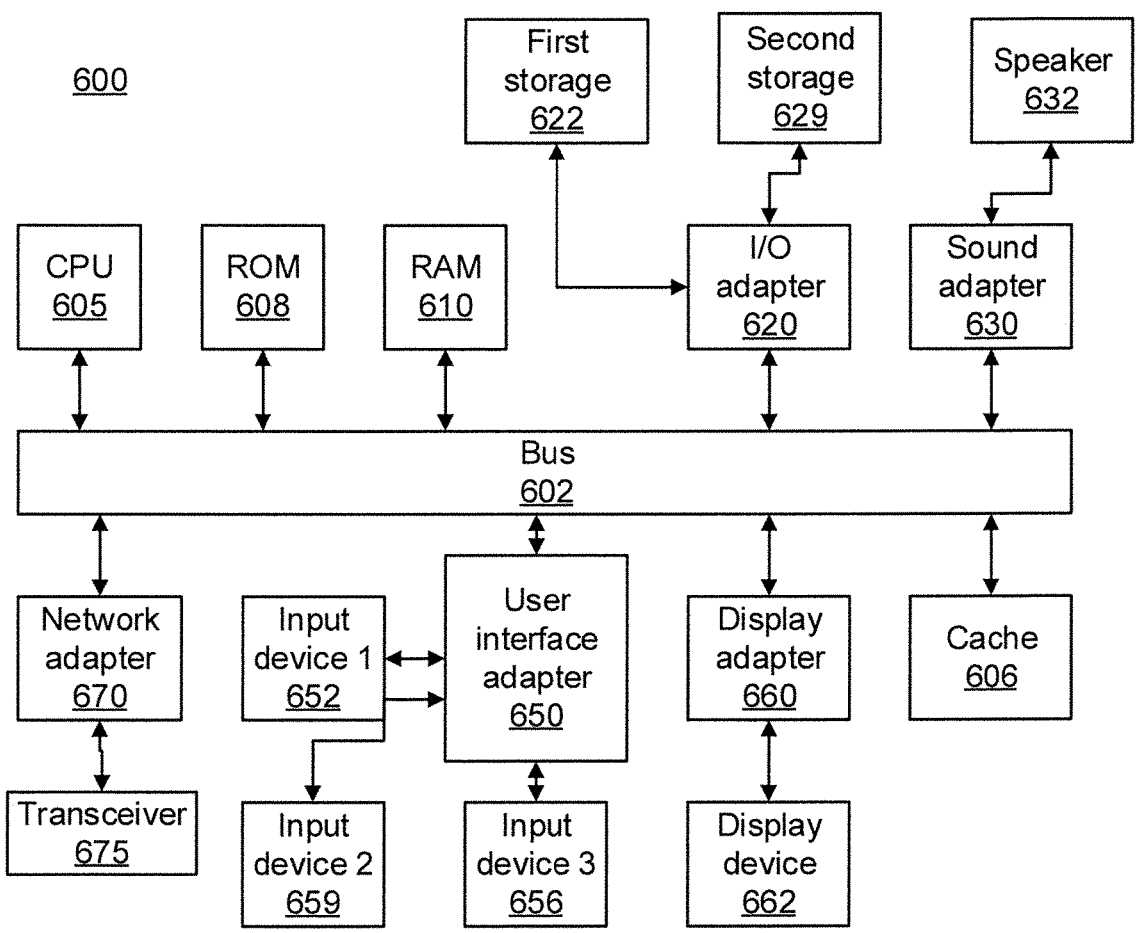
FIG. 6 shows a block diagram illustrating a computer processing system, in accordance with an embodiment of the present principles.

Referring to FIG. 6, an exemplary computer system 600 is shown which may represent a server or a network device, in accordance with an embodiment of the present invention. The computer system 600 includes at least one processor (CPU) 605 operatively coupled to other components via a system bus 602. A cache 606, a Read Only Memory (ROM) 608, a Random-Access Memory (RAM) 610, an input/output (I/O) adapter 620, a sound adapter 630, a network adapter 670, a user interface adapter 650, and a display adapter 660, are operatively coupled to the system bus 602.

A first storage device 622 and a second storage device 629 are operatively coupled to system bus 602 by the I/O adapter 620. The storage devices 622 and 629 can be any of a disk storage device (e.g., a magnetic or optical disk storage device), a solid state magnetic device, and so forth. The storage devices 622 and 629 can be the same type of storage device or different types of storage devices.

A speaker 632 may be operatively coupled to system bus 602 by the sound adapter 630. A transceiver 675 is operatively coupled to system bus 602 by network adapter 670. A display device 662 is operatively coupled to system bus 602 by display adapter 660.

A first user input device 652, a second user input device 659, and a third user input device 656 are operatively coupled to system bus 602 by user interface adapter 650. The user input devices 652, 659, and 656 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 652, 659, and 656 can be the same type of user input device or different types of user input devices. The user input devices 652, 659, and 656 are used to input and output information to and from system 600.

Of course, the computer system 600 may also include other elements (not shown), as readily contemplated by one of skill in the art, as well as omit certain elements. For example, various other input devices and/or output devices can be included in computer system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 600 are readily contemplated by one of ordinary skill in the art given the teachings of the present invention provided herein.

Moreover, part or all of processing system 600 may implement in one or more of the elements of DCMS 112.

Further, it is to be appreciated that processing system 600 may perform at least part of the method described herein including, for example, at least part of method 200 of FIG. 2 and/or at least part of method 400 of FIG. 4 and/or at least part of method 500 of FIG. 5 and/or at least part of method 700 of FIG. 7 and/or at least part of method 800 of FIG. 8.

Referring to FIG. 7, a flow diagram of a method 700 performed in the forecaster is illustratively shown, in accordance with an embodiment of the present invention. In block 710, receive an active power demand for a facility, a current load demand charge threshold (DCT) profile for the facility, and a plurality of previously observed load DCT profiles. In block 720, generate a data set of DCT values based on the current load DCT profile for the facility and the plurality of previously observed load DCT profiles. In block 730, forecast a next month DCT value for the facility using the data set of DCT values. In block 740, prevent actual power used from a utility from exceeding the forecast DCT by discharging a battery storage system into a behind the meter power infrastructure for the facility.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for demand charge management, comprising:
   receiving an active power demand for a facility, a current load demand charge threshold (DCT) profile for the facility, and a plurality of previously observed load DCT profiles;
   generating a data set of DCT values based on the current load DCT profile for the facility and the plurality of previously observed load DCT profiles;
   forecasting a forecast DCT value for a next month for the facility using the data set of DCT values by adding a DCT value for the next month from a previous year to a summation of DCT values in the data set of DCT values and then dividing by a number of DCT values in the data set of DCT values plus 1; and
   preventing actual power used from a utility from exceeding the forecast DCT value by discharging a battery storage system into a behind the meter power infrastructure for the facility.

2. The computer-implemented method of claim 1, further comprising charging the battery storage system when the active power demand is less than the forecast DCT.

3. The computer-implemented method of claim 2, wherein said charging step comprises confirming a current state of charge is less than a maximum state of charge.

4. The computer-implemented method of claim 1, wherein said discharging step occurs when a current state of charge is greater than or equal to a minimum state of charge.

5. The computer-implemented method of claim 1, wherein the plurality of previously observed load DCT profiles include profiles from the facility and other facilities.

6. The computer-implemented method of claim 1, wherein said forecasting step comprises computing the Euclidean distance between the current DCT profile and one or more of the plurality of previously observed load DCT profiles in the data set of DCT values.

7. The computer-implemented method of claim 6, wherein said forecasting step comprises generating a similarity group of DCT profiles including the current DCT profile and the one or more of the plurality of previously observed load DCT profiles with computed Euclidean distances less than a threshold value.

8. The computer-implemented method of claim 7, wherein said forecasting step comprises normalizing DCT values of DCT profiles in the similarity group of DCT profiles.

9. The computer-implemented method of claim 8, wherein said forecasting step uses an average of the normalized DCT values of DCT profiles in the similarity group of DCT profiles.

10. A computer program product for demand charge management, the computer program product comprising a non-transitory computer readable storage medium having program instructions embodied therewith, the program instructions executable by a computer to cause the computer to perform a method comprising:
receiving an active power demand for a facility, a current load demand charge threshold (DCT) profile for the facility, and a plurality of previously observed load DCT profiles;
generating a data set of DCT values based on the current load DCT profile for the facility and the plurality of previously observed load DCT profiles;
forecasting a forecast DCT value for a next month for the facility using the data set of DCT values by adding a DCT value for the next month from a previous year to a summation of DCT values in the data set of DCT values and then dividing by a number of DCT values in the data set of DCT values plus 1; and
preventing actual power used from a utility from exceeding the forecast DCT value by discharging a battery storage system into a behind the meter power infrastructure for the facility.

11. A demand charge management system, comprising:
a processor configured to:
receive an active power demand for a facility, a current load demand charge threshold (DCT) profile for the facility, and a plurality of previously observed load DCT profiles;
generate a data set of DCT values based on the current load DCT profile for the facility and the plurality of previously observed load DCT profiles;
forecast a forecast DCT value for a next month for the facility using the data set of DCT values by adding a DCT value for the next month from a previous year to a summation of DCT values in the data set of DCT values and then dividing by a number of DCT values in the data set of DCT values plus 1; and
prevent actual power used from a utility from exceeding the forecast DCT by discharging a battery storage system into a behind the meter power infrastructure for the facility.

12. The system of claim 11, wherein the processor is further configured to charge the battery storage system when the active power demand is less than the forecast DCT.

13. The system of claim 12, wherein the processor is further configured to charge the battery storage system after confirming a current state of charge is less than a maximum state of charge.

14. The system of claim 11, wherein the processor is further configured to discharge the battery storage system occurs when a current state of charge is greater than or equal to a minimum state of charge.

15. The system of claim 11, wherein the plurality of previously observed load DCT profiles include profiles from the facility and other.

16. The system of claim 11, wherein the processor forecasts the next month DCT value by computing the Euclidean distance between the current DCT profile and one or more of the plurality of previously observed load DCT profiles in the data set of DCT values.

17. The system of claim 16, wherein the processor forecasts the next month DCT value by generating a similarity group of DCT profiles including the current DCT profile and the one or more of the plurality of previously observed load DCT profiles with computed Euclidean distances less than a threshold value.

18. The system of claim 17, wherein the processor forecasts the next month DCT value by normalizing DCT values of DCT profiles in the similarity group of DCT profiles.

19. The system of claim 18, wherein the processor forecasts the next month DCT value by using an average of the normalized DCT values of DCT profiles in the similarity group of DCT profiles.

20. The system of claim 11, wherein the plurality of previously observed load DCT profiles includes profiles for the facility that span one or more time periods.

* * * * *